United States Patent [19]

Tschishow

[11] Patent Number: 4,575,398
[45] Date of Patent: Mar. 11, 1986

[54] METHOD FOR PREVENTING NEWTON RING TYPE PATTERNS PARTICULARLY IN COLOR SEPARATION SCANNING OF TRANSPARENCIES

[76] Inventor: Michael Tschishow, 485 Gatewood La., Sierra Madre, Calif. 91024

[21] Appl. No.: 393,750

[22] Filed: Jun. 30, 1982

[51] Int. Cl.$^4$ .................. B05D 5/06; B32B 31/12; G02B 1/10
[52] U.S. Cl. .................. 156/99; 156/281; 156/326; 427/164; 427/165; 427/168
[58] Field of Search .......... 156/99, 281, 326; 427/164, 165, 168

[56] References Cited

U.S. PATENT DOCUMENTS 4,168,332 9/1979 Leinen et al. .................. 427/164 X

*Primary Examiner*—James R. Hoffman
*Attorney, Agent, or Firm*—William H. Pavitt, Jr.; Natan Epstein

[57] ABSTRACT

A method as disclosed for preventing the formation of Newton ring light patterns between a transparency or photographic negative and a transparent mounting surface such as a sheet of glass. The method comprises the application of a thin film of a substantially transparent resin to form a matte surface finish on the surface of the transparency to be applied against the mounting surface and then mounting the transparency or equivalent to the mounting surface with the resin film interposed therebetween, such that the matte resin film serves as a spacer and also reduces reflection of light between the transparency surface and the mounting surface.

9 Claims, 5 Drawing Figures

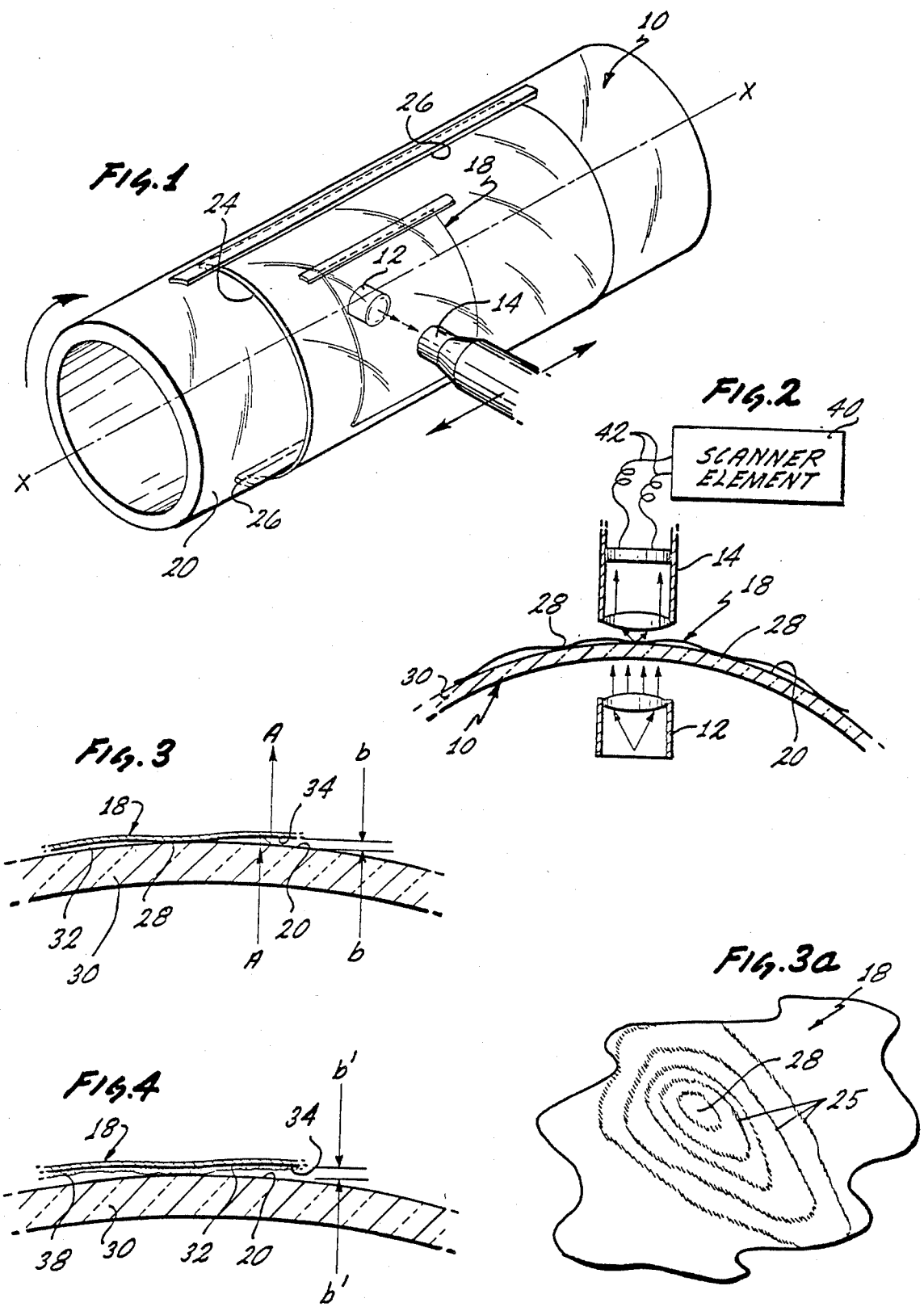

METHOD FOR PREVENTING NEWTON RING TYPE PATTERNS PARTICULARLY IN COLOR SEPARATION SCANNING OF TRANSPARENCIES

BACKGROUND OF THE INVENTION

1. Field of the Invention

The present invention relates to processes and materials useful for preventing the formation of Newton ring difraction patterns which occur when a transparent concave surface is placed against a plane transparent surface, and more particularly is concerned with the prevention of such Newton ring patterns when a photographic film transparency is mounted onto the outer surface of a smooth transparent cylinder as in color separation scanning of color transparencies in the printing industry.

2. State of the Prior Art

In modern printing of multi-color pictorial matter the colors of the original artwork or photographic transparency are separated by electronic scanning into four primary colors to make litho half tone films. Four such litho films, each associated with one color are used to determine the ink patterns on the printing paper such that when colored inks corresponding to the separated colors are applied according to the half tone litho images the original colors of the artwork or photograph are reconstituted on the printed sheet.

Typical color separation scanning equipment in use at the present time includes a cylinder of highly polished and optically transparent material such as glass or plastic which is caused to rotate in the scanner about its longitudinal axis.

The photographic transparency to be processed is mounted to the exterior cylindrical surface of the drum or cylinder and placed in the scanner. A light source moves axially within the cylinder so as to illuminate the rotating transparency, while a high resolution photosensing device scans the opposite side of the transparency to derive an electrical output indicative of the relative presence of each of the four basic colors which are normally selected to by cyan, magenta, yellow, and black. The electrical output of the photosensor is processed electronically and used to make a litho half tone film consisting of small dots in a dense pattern which determines the application of the colored inks during subsequent printing. Four such litho films are prepared. The dots of each half tone litho film are offset relative to the other four such that the four colors of ink are not superimposed during printing but instead are applied adjacently one to another. When the final printed image is viewed with the unaided eye, the adjacent colored dots blend into the desired hue determined by the relative presence of the four basic color inks.

The electronic scanners used in the industry at this time are capable of considerable magnification of the original photographic transparency, up to approximately two thousand times, adjustable by the operator. It is common therefore to use relatively small format transparencies, such as 35 mm film frames and enlarge these to half tone litho images of 8 by 11 inches. Minute flaws barely perceptible on the original transparency are thus greatly magnified and may make a particular set of litho films unusable. For example, small scratches, air bubbles, dust, etc. must all be carefully avoided and the process generally carried out under clean room conditions.

A particularly troublesome condition has been the formation of so-called Newton rings when the transparency is mounted to the transparent cylinder and which are magnified in the enlargement. The appearance of such Newton ring patterns normally make the resulting litho films unusable. To correct the condition, the transparency must be removed from the mounting cylinder and remounted. The industry has resorted to two presently known approaches to resolve this source of difficulty. One attempted solution has been the use of an oil mount which involves the formation of a thin film of oil, such as Paraffin oil, between the transparency and the outer surface of the transparent cylinder. This method requires considerable care in the application of the oil because very minute air bubbles tend to form if any unevenness is present in the transparency. Any such air bubbles are of course greatly magnified and make the resulting half tone litho images unusable. As presently practiced, oil mounting of transparencies involves the fastening of a sheet of clear acetate along one edge thereof parallel to the longitudinal axis of the mounting cylinder. The color transparency is positioned between the acetate sheet and the cylinder surface and a small quantity of oil is applied along one edge of the transparency. The transparency thus sandwiched between the clear acetate and the drum is passed through a device which includes a pressure roller which moves over the clear acetate so as to evenly spread the oil in a thin film between the transparency and the mounting cylinder. The opposite edge of the clear acetate is then secured to the mounting cylinder as by means of a strip of adhesive tape. The mounted transparency is then carefully examined with the aid of a magnifying glass to detect the presence of any air bubbles. If any are found, the mounting procedure must be repeated until a bubble free oil film is obtained. The cylinder with the transparency mounted thereon is then inserted between the rotating spindles of the color scanner and the color separation process is then allowed to proceed. Once completed, the transparency is separated from the cylinder which must then be cleaned with a suitable solvent to remove all traces of mounting oil. The oil mounting procedure is painstaking and cumbersome and requires cleaning of both the cylinder and transparency after the color separation process has been completed.

An alternate procedure involves the use of so-called Newton ring powder, such as the product sold under the mark Rutherford Contact-Aid by the Rutherford Machinery Company, division of Sun Chemical Company. This product is a fine white powder which is lightly applied to the surface of the transparency to be placed in contact with the outer surface of the mounting cylinder in the scanner. This powder is a dry material consisting of minute particles of optically opaque material which is interposed between the contact surfaces of the transparency and the cylinder and in effect acts as a spacer between these surfaces. This spacing of the smooth surfaces is sufficient to prevent the occurence of the Newton ring patterns and has been adequate in the past. With presently used electronic scanners capable of very high magnification, however, the use of such powdered materials becomes objectionable in that the individual grains are enlarged sufficiently by the scanner to become visible in the enlarged screen and to detrimentally affect the quality of the resulting image. In addition, it is difficult to apply the anti-Newton ring powder evenly over the transparency surface and in just the right quantity to avoid the ring patterns without obscuring the photographic image.

There is therefore a continuing need in the color separation industry for improvement in the methods available for preventing the appearance of such Newton ring patterns during the preparation of color separation masks in color scanners. Newton ring patterns are a known optical phenomenon which occurs when a concave transparent surface is pressed or mounted against a plane transparent surface. In the vicinity of the point of contact between the concave and plane surfaces a thin air space or film exists due to the slight separation between the two. The Newton rings are colored rings caused by the interference effects which occur between light waves reflected at the upper and lower surfaces of the air film separating the convex surface and the flat surface. It is believed that the presence of moisture encourages the occurence of Newton rings when color transparencies are mounted to the cylinder of the color scanner.

SUMMARY OF THE INVENTION

The present invention improves over the prior art by providing a composition which is applied preferably by spraying over the surface of the color transparency to be mounted against the transparent cylinder. The spray is a resinous solution having low surface tension so as to readily wet the transparency surface and thus very evenly coat the same. The solution dries on the transparency to a matte finish which is effective for preventing the unwanted Newton ring patterns. The use of a sprayable solution also provides a faster, easier and more even application of the coating to the transparency surface and eliminates the clean up problems associated with the oil mountings of the prior art. The resinous solution is allowed to dry prior to mounting of the transparency to the cylinder so that the liquid material is not transferred to the cylinder surface and no cleaning thereof is necessary once the color separation process has been carried out. The resinous coating applied to the transparency is not detrimental to the optical quality of the color image and no cleaning of the transparency is required.

The resin is selected such that the resin film formed on the transparency is optically clear so that no degradation of the image occurs as has been the case in the prior art when anti-Newton ring powder was applied, even at the highest magnifications in use today.

If desired, the resin film may be applied to the surface of the scanner cylinder instead of the transparency. Generally the method of this invention contemplates the formation of a matte slightly rough surface interposed between the transparency and the outer surface of the scanner cylinder to act as a spacer and reduce reflections of light therebetween.

BRIEF DESCRIPTION OF THE DRAWINGS

FIG. 1 is a fragmentary perspective view of the rotatable cylinder and associated light source and scanning photodetector in a typical electronic scanner.

FIG. 2 is a schematic sectional representation of the optical scanning arrangement of a transparency mounted to the scanner cylinder of FIG. 1.

FIG. 3 is an enlarged sectional view of a transparency mounted to the cylinder surface illustrating the formation of thin air films in the vicinity of a point of contact between the transparency and cylinder wall which creates the objectionable Newton ring patterns.

FIG. 3a is a plan view of the section of FIG. 3 showing typical Newton ring light patterns about the point of contact.

FIG. 4 illustrates in magnified cross section a transparency treated according to the method of this invention showing the resultant spacing between the transparency and the cylinder surface.

DETAILED DESCRIPTION OF THE INVENTION

With reference to FIG. 1 of the drawings a mounting cylinder or drum 10 is shown positioned along a axis of rotation x—x in an electronic color scanner machine. A light source 12 is mounted by means not shown in the drawings for axial translation within the cylinder in synchronous relationship with a high resolution photoelectric detector 14 mounted on the opposite side of the cylinder wall, also by means not shown in the drawing.

The apparatus is controlled by servo-means known to the art such that a scanning pattern is developed with the photodetector and light source moving axially across the cylinder surface while the cylinder is rotating at a fixed speed. An electrical output is generated by the photodetector 14 which is analyzed by suitable electronic circuits to derive a color separation pattern representative of the relative intensity of four selected colors. The color separation output is used in the preparation of H. T. litho films in a manner known to the art.

A transparency sheet 18 is shown mounted to the outer surface 20 of the mounting drum 10 and retained under a sheet of clear acetate 24 affixed by means of adhesive tape 26. The light source 12 projects a beam of light through both the cylinder wall 30 and the transparency sheet 18 mounted thereto. The transmitted light is detected by the photosensor 14 mounted on the opposite side of the drum wall. The electrical output of the photodetector is connected by conductors 42 to an electronic analyzer and color separator circuit 40.

Although the transparency sheet may appear in most instances to lie flat against the cylinder, in fact the transparency will often have waves and irregularly distributed concave and convex areas as shown in FIG. 2 which will result in point areas of contact 28 with the cylinder surface. As better seen in FIG. 3, the transparency sheet thus defines with the cylinder wall 30 an air film 32 bounded by the inner transparency surface 34 and the outer cylinder surface 20. The thickness of the air space 32 is small, particularly in the immediate vicinity of the point of contact 28 and thus gives rise to newton ring interference patterns 25 such as illustrated in FIG. 3a when the light beam from the light source 12 passes through the air film 32 and some portion of it reflects between the surfaces 34 and 20.

According to the present invention the surface 34 of the transparency 18 is sprayed evenly with a resinous solution such as the spray formulation made and sold by Aerosol Services Company, Inc. of 425 South Ninth Avenue, City Of Industry, Calif. 91746 and identified as their Master Lab book number L23411C.

The resin dissolved in the spray formulation may be a resin such as used in commercially available hair setting spray preparations, for example that sold as L'oreal unsented hairspray which dries to a film transparent to light but having a matte finish. The commercial available hairspray itself is usable in the present method, but only at low scanner magnifications. To the naked eye the resultant dry film is highly even and is smooth to the touch, showing no apparent optical imperfections or distortions. When viewed under a microscope, however, the dry resin film 38 shows surface irregularities including peaks and valleys such as shown in exaggerated proportion to the transparency sheet in the enlarged section of FIG. 4. The resin coating 38 thus serves as a spacer between the inner surface 34 of the transparency and the outer surface 36 of the mounting cylinder. Not only is a spacer effect obtained by the resin coating but in addition thereto the matte finish obtained on the transparency inhibits the reflections of light such as suggested by ray A—A in FIG. 3 which is typical of the reflections believed to be the cause of the Newton ring patterns. All this is achieved without interposing any opaque material such as used in the powder of the prior art between the mounting cylinder and the transparency.

The resinous solution may be packaged in a spray container and propelled by a suitable aerosol through a spray valve. The solvent system is selected so as to reduce the surface tension of the resinous solution so as to obtain good wetting of the transparency surface and a very even coating of resin when the solution dries. If desired different spray valve orifices may be used to vary the droplet size of the spray to obtain a satisfactory application of the resin solution. As supplied by the Aerosol Services Company, their above-identified spray formulation is packaged in an appropriate spray dispenser ready for use according to the process herein disclosed.

The color transparencies are normally supplied by e.g. a publisher or advertising agency to the color separation house for processing. The method of the present invention is practiced by cleaning carefully the transparency to remove any dust and particulate matter deposited therein. The resinous solution is then evenly sprayed over the surface of the transparency to be applied against the outer surface of the transparent mounting cylinder. The resinous spray is allowed to dry and the transparency is then mounted to the cylinder in the conventional manner, such as by being sandwiched between the transparent cylinder and a sheet of clear acetate taped to the cylinder. The mounted transparency is then ready for processing in the color scanner. The resinous spray is effective regardless of whether the transparency is mounted with the emulsion side towards or away from the cylinder.

In the oil mounting method of the prior art it was not possible to oil mount a transparency which had been nicked or damaged by bending in any way. Any such surface irregularity encouraged the formation of air bubbles which made such air mounted transparency unusable. No such shortcomings are present in the process of this invention. The resinous spray can be applied quickly and cleanly to the transparency and results in an mounting optically superior to those possible by the methods of the prior art.

While the invention has been described with reference to a particular embodiment and manner of practicing the invention, various changes will be apparent to those skilled in the art without departing from the spirit and scope of the invention. Applicant therefore intends to be bound only by the scope of the following claims.

What is claimed is:

1. A method for preventing the formation of Newton ring light patterns between a transparency or the like and a transparent mounting surface, said method comprising the steps of:
   applying a thin film of a substantially transparent resin to form a matte surface finish on the surface of said transparency to be applied against said mounting surface; and mounting said transparency to said mounting surface with said resin film interposed therebetween, such that said matte resin film serves as a spacer and also reduces reflection of light between said transparency surface and said mounting surface.

2. The method of claim 1 wherein said step of applying further comprises the steps of:
   applying a resinous solution on the surface of the transparency to be applied against the outer surface of the transparent mounting surface; and
   allowing the resinous solution to dry so as to form a thin resin film having a matte finish over the transparency surface.

3. The method of claim 2 wherein said step of applying comprises the step of spraying said resinous solution.

4. The method of claim 2 or claim 3 wherein said resinous solution comprises a resin substantially transparent to light dissolved in a solvent system selected for low surface tension to obtain good wetting of a surface sprayed with said solution.

5. The method of claim 4 wherein said resin is of the type used in commercially available hair setting spray preparations.

6. The method of claim 3 wherein said resin is of the type used in commercially available hair setting spray preparations.

7. A method for preventing the formation of Newton ring light patterns between a transparency or the like and a transparent mounting surface, said method comprising the steps of:
   spraying a resinous solution on the surface of the transparency to be applied against the transparent mounting surface, said solution comprising a resin substantially transparent to light dissolved in a solvent system selected for low surface tension to obtain good wetting of a surface sprayed with said solution; and
   allowing the sprayed resinous solution to dry so as to form a thin resin film having a matte finish over the transparency surface, such that said matte resin film serves as a spacer and also reduces reflection of light between said transparency surface and said mounting surface.

8. The method of claim 7 wherein said resin is of the type used in commercially available hair setting spray preparations.

9. The method of claim 1 wherein said resin is of the type used in commercially available hair setting spray preparations.

* * * * *